(12) United States Patent
Takikawa et al.

(10) Patent No.: US 10,793,690 B2
(45) Date of Patent: Oct. 6, 2020

(54) PREPREG AND MOLDED ARTICLE

(71) Applicant: DIC Corporation, Tokyo (JP)

(72) Inventors: Yuko Takikawa, Takaishi (JP); Tomoaki Shinchi, Takaishi (JP); Iwao Hattori, Komaki (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 16/087,198

(22) PCT Filed: Mar. 9, 2017

(86) PCT No.: PCT/JP2017/009423
§ 371 (c)(1),
(2) Date: Sep. 21, 2018

(87) PCT Pub. No.: WO2017/163899
PCT Pub. Date: Sep. 28, 2017

(65) Prior Publication Data
US 2019/0092915 A1    Mar. 28, 2019

(30) Foreign Application Priority Data
Mar. 24, 2016 (JP) .................. 2016-060094

(51) Int. Cl.
| | | |
|---|---|---|
| *C08J 5/24* | (2006.01) | |
| *C08G 18/16* | (2006.01) | |
| *C08G 18/67* | (2006.01) | |
| *C08G 18/76* | (2006.01) | |
| *C08J 5/04* | (2006.01) | |
| *C08F 290/06* | (2006.01) | |
| *C08G 18/48* | (2006.01) | |
| *C08G 18/65* | (2006.01) | |
| *C08G 18/72* | (2006.01) | |

(52) U.S. Cl.
CPC .............. *C08J 5/24* (2013.01); *C08F 290/06* (2013.01); *C08G 18/4862* (2013.01); *C08G 18/65* (2013.01); *C08G 18/6755* (2013.01); *C08G 18/721* (2013.01); *C08G 18/728* (2013.01); *C08G 18/7671* (2013.01); *C08J 5/042* (2013.01); *C08J 2375/14* (2013.01)

(58) Field of Classification Search
None
See application file for complete search history.

(56) References Cited

U.S. PATENT DOCUMENTS 5,382,619 A * 1/1995 Takayama ........... C08F 283/008
  524/437
2015/0361035 A1   12/2015 Moroiwa et al.

FOREIGN PATENT DOCUMENTS

| JP | 62-135528 A | 6/1987 |
|---|---|---|
| JP | H03-192111 A | 8/1991 |
| JP | H05-339332 A | 12/1993 |
| JP | 2006-152161 A | 6/2006 |
| WO | 2011/092962 | 4/2011 |
| WO | 2014/119234 A1 | 8/2014 |
| WO | 2015/133289 A1 | 9/2015 |
| WO | 2017/043325 A1 | 3/2017 |

OTHER PUBLICATIONS

International Search Report dated May 30, 2017, issued for PCT/JP2017/009423.
Supplemental European Search Report and Search Opinion issued in corresponding European Patent Application No. EP 17769944, dated Oct. 1, 2019.

* cited by examiner

*Primary Examiner* — Tae H Yoon
(74) *Attorney, Agent, or Firm* — Locke Lord LLP; James E. Armstrong, IV; Nicholas J. DiCeglie, Jr.

(57) ABSTRACT

Provided is a prepreg including: a urethane (meth)acrylate that is a reaction product of a polyisocyanate compound comprising a polymethylene polyphenyl polyisocyanate as an essential component with a hydroxyl group-containing compound comprising, as an essential component, a compound having a hydroxyl group and a (meth)acryloyl group; a polymerization initiator; and carbon fibers. The prepreg is excellent in workability and molding property and can form molded products excellent in various physical properties such as interlayer shear strength and heat resistance. Thus, the prepreg is suitable for use in various molded articles including automotive members.

2 Claims, No Drawings

PREPREG AND MOLDED ARTICLE

CROSS REFERENCE TO RELATED APPLICATIONS

This Application is a U.S. 371 National Phase of International PCT Patent Application No. PCT/JP2017/009423, filed Mar. 9, 2017, which application claims priority to Japanese Patent Application No. 2016-060094 filed on Mar. 24, 2016. The entire contents of these applications are incorporated herein by reference in their entirety.

TECHNICAL FIELD

The present invention relates to a prepreg which is excellent in workability and molding property and can form molded articles excellent in various physical properties including interlayer shear strength, and to a molded article thereof.

BACKGROUND ART

Fiber-reinforced resin composite materials which are reinforced with reinforcing fibers such as carbon fibers or glass fibers have drawn attention in terms of their light-weight and characteristics such as excellent heat resistance or mechanical strength. Use of them is expanding in various structural applications such as casing bodies or various members for automobiles and airplanes. Such fiber-reinforced resin composite materials are formed using, for example, a method in which an intermediate material called a prepreg, which is obtained by impregnating reinforcing fibers with a thermosetting resin, is used and subjected to curing and molding by autoclave molding or press molding.

In general, resins for prepregs are required to have both stability at room temperature and the ability to be cured by heating or the like. In general, therefore, thermosetting resins such as epoxy resin compositions are frequently used for prepregs. However, prepregs produced with epoxy resins have a problem in that they can undergo curing at room temperature and thus need to be stored under refrigerated conditions.

To solve this problem, a radically polymerizable resin composition that can achieve high productivity and stability at room temperature has been developed (see, PTL 1, for example). The radically polymerizable resin composition contains a radically polymerizable resin including, as essential components, a tri(meth)acrylate compound with a specific structure, a (meth)acrylic acid adduct of bisphenol A diglycidyl ether, and a di(meth)acrylate compound with a specific structure. However, the radically polymerizable resin composition has a problem in that, to improve the workability (tack property) of a prepreg, UV curing is necessary, and the interlayer adhesion of a molded article is insufficient.

Accordingly, there has been a need for a material which has excellent workability and can form molded articles excellent in various physical properties including interlayer shear strength.

CITATION LIST

Patent Literature

PTL 1: JP-A-2006-152161

SUMMARY OF THE INVENTION

Technical Problem

An object to be achieved by the invention is to provide a prepreg which is excellent in workability and molding property and can form molded articles excellent in various physical properties such as interlayer shear strength and heat resistance, and to provide a molded article thereof.

Solution to Problem

The present inventors have found that a prepreg produced with a specific urethane (meth)acrylate, a polymerization initiator, and carbon fibers as essential raw materials has excellent workability and molding property and makes it possible to obtain a molded article having various excellent physical properties such as high interlayer shear strength and high heat resistance, and thus have completed the invention.

Specifically, the invention relates to a prepreg including: a urethane (meth)acrylate (A) that is a reaction product of a polyisocyanate compound (a1) including a polymethylene polyphenyl polyisocyanate (a1-1) as an essential component with a hydroxyl group-containing compound (a2) including, as an essential component, a compound (a2-1) having a hydroxyl group and a (meth)acryloyl group; a polymerization initiator (B); and carbon fibers (C), and to a molded article thereof.

Advantageous Effects of Invention

Molded articles obtained from the prepreg of the invention are excellent in interlayer shear strength, heat resistance, and the like, and thus suitable for use in automotive members, railroad car members, airspace craft members, ship members, house facility members, sports members, light-weight vehicle members, construction and civil engineering members, case bodies for OA instrument, and the like.

DESCRIPTION OF EMBODIMENTS

The prepreg of the invention includes a urethane (meth) acrylate (A) that is a reaction product of a polyisocyanate compound (a1) including a polymethylene polyphenyl polyisocyanate (a1-1) as an essential component with a hydroxyl group-containing compound (a2) including, as an essential component, a compound (a2-1) having a hydroxyl group and a (meth)acryloyl group; a polymerization initiator (B); and carbon fibers (C).

The urethane (meth)acrylate (A) is a reaction product of the polyisocyanate compound (a1) with the hydroxyl group-containing compound (a2).

It is important that the polyisocyanate compound (a1) has the polymethylene polyphenyl polyisocyanate (a1-1) as an essential raw material. Based on the aromatic-ring multinuclear structure of the polymethylene polyphenyl polyisocyanate (a1-1) which has high affinity to carbon fiber surface, a molded article having enhanced adhesiveness to carbon fibers and excellent interlayer shear strength is obtained. Furthermore, the polymethylene polyphenyl polyisocyanate (a1-1) may be used either singly or in combination of two or more kinds thereof.

The polymethylene polyphenyl polyisocyanate (a1-1) is represented by the following general formula (1).

[Chem. 1]

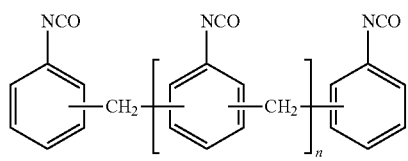

(1)

(In the formula, n is an integer of 1 or more).

Examples of a commercially available product which can be used as the polymethylene polyphenyl polyisocyanate (a1-1) include "MILLIONATE MR-100" and "MILLIONATE MR-200" manufactured by Tosoh Corporation, "WANNATE PM-200" and "WANNATE PM-400" manufactured by Wanhua Chemical Group Co., Ltd., "COSMONATE M-1500" manufactured by Mitsui Chemicals, Inc., and "VORANATE M-595" manufactured by The Dow Chemical Company.

Furthermore, from the viewpoint that the interlayer shear strength of a molded article to be obtained is further enhanced, the content of the polymethylene polyphenyl polyisocyanate (a1-1) in the raw materials for prepreg excluding the carbon fibers (C) is preferably in the range of from 1 to 40% by mass.

As for the polyisocyanate compound (a1), a polyisocyanate (a1-2) other than the polymethylene polyphenyl polyisocyanate (a1-1) can be used in combination.

Examples of the other polyisocyanate (a1-2) include aromatic polyisocyanates such as diphenylmethane diisocyanate (MDI), modified product of diphenylmethane diisocyanate including carbodiimide modified product, nurate modified product, biurette modified product, urethane imine modified product of diphenylmethane diisocyanate, and polyol modified product which is modified from polyol with number average molecular weight of 1,000 or less like diethylene glycol and dipropylene glycol, tolylene diisocyanate (TDI), tolidine diisocyanate, polymethylene polyphenyl polyisocyanate, xylylene diisocyanate, 1,5-naphthalene diisocyanate, and tetramethylxylene diisocyanate; alicyclic polyisocynates such as isophorone diisocyanate (IPDI), hydrogenated diphenylmethane diisocyanate, hydrogenated xylylene diisocyanate, or norbornene diisocyanate; and aliphatic polyisocyanates such as hexamethylene diisocyanate, nurate modified product, biurette modified product, and adduct of hexamethylene diisocyanate, or dimeric acid diisocyanate.

The hydroxyl group-containing compound (a2) includes, as an essential raw material, the compound (a2-1) having a hydroxyl group and a (meth)acryloyl group.

Examples of the compound (a2-1) having a hydroxyl group and a (meth)acryloyl group include hydroxyalkyl (meth)acrylate and epoxy(meth)acrylate. Furthermore, the compound (a2-1) having a hydroxyl group and a (meth) acryloyl group may be used either singly or in combination of two or more kinds thereof.

Examples of the hydroxyalkyl (meth)acrylate include 2-hydroxyethyl (meth)acrylate, 3-hydroxypropyl (meth) acrylate, 4-hydroxy-n-butyl (meth)acrylate, 2-hydroxypropyl (meth)acrylate, 2-hydroxy-n-butyl (meth)acrylate, and 3-hydroxy-n-butyl (meth)acrylate, but 2-hydroxyethyl (meth)acrylate is preferable. Furthermore, the hydroxyalkyl (meth)acrylate (B) may be used either singly or in combination of two or more kinds thereof.

The epoxy(meth)acrylate can be obtained by reacting an epoxy resin with (meth)acrylic acid and/or (meth)acrylic acid anhydride.

Concerning the hydroxyl group-containing compound (a2), the compound (a2-1) having a hydroxyl group and a (meth)acryloyl group is preferably used in combination with a polyol (a2-2) other than the compound (a2-1), so that the resulting molded article can have more improved toughness and other properties.

Examples of the other polyol (a2-2) include polyether polyol, polyester polyol, polycarbonate polyol, and polyalkylene polyol.

The molar ratio (NCO/OH) between the isocyanate group (NCO) of the isocyanate compound (a1) and the hydroxyl group (OH) of the hydroxyl group-containing compound (a2), which are raw materials for the urethane (meth)acrylate (A), is preferably 0.1 to 1.5, and more preferably 0.3 to 1.2.

As for the polymerization initiator (B), organic peroxides are preferable, although it is not particularly limited thereto. Examples thereof include a diacylperoxide compound, a peroxyester compound, a hydroperoxide compound, a ketone peroxide compound, an alkyl perester compound, a percarbonate compound, and a peroxyketal, and it can be suitably selected depending on the conditions for molding. Furthermore, the polymerization initiator (B) may be used either singly or in combination of two or more kinds thereof.

Furthermore, for the purpose of shortening the molding time, it is preferable to use, among the above, a polymerization initiator of which temperature for obtaining the half life of 10 hour is 70° C. or higher and 100° C. or lower. It is preferable in that, when the temperature is 70° C. or higher and 100° C. or lower, a prepreg can have long service life at room temperature and also curing can be achieved within a short time (5 minutes or shorter). According to combination with the prepreg of the invention, more excellent curing property and molding property can be obtained. Examples of the polymerization initiator include 1,6-bis(t-butylperoxycarbonyloxy)hexane, 1,1-bis(t-butylperoxy)cyclohexane, 1,1-bis(t-amylperoxy)cyclohexane, 1,1-bis(t-hexylperoxy) cyclohexane, t-butylperoxy diethyl acetate, t-butylperoxyisopropyl carbonate, t-amylperoxyisopropyl carbonate, t-hexylperoxyisopropyl carbonate, di-tert-butylperoxyhexahydroterephthalate, t-amylperoxytrimethylhexanoate, and t-hexylperoxy-2-ethylhexanoate.

The content of the polymerization initiator (B) is preferably in the range of 0.3 to 3% by mass in the prepreg components excluding the carbon fibers (C), from the viewpoint of having both excellent curing characteristic and storage stability.

The carbon fibers (C) used may be of various types such as polyacrylonitrile-based carbon fibers, pitch-based carbon fibers, rayon-based carbon fibers. Among them, polyacrylonitrile-based carbon fibers are preferred because they can easily provide high-strength carbon fibers.

The form of the carbon fibers (C) is not particularly limited. The carbon fibers (C) may be in the form of a reinforcing fiber tow in which reinforcing fiber filaments are gathered, a unidirectional material obtained by bundling reinforcing fiber tows in one direction, a woven fabric, or a non-woven fabric made of short-cut reinforcing fibers. Preferably, the reinforcing fibers are used in the form of a unidirectional material, stacked and molded, so that high mechanical property can be obtained.

Examples of the woven-fabric include a stitching sheet or the like represented by plain fabric, twill fabric, strain fabric, or non-crimped fabric, in which a sheet resulting from combining fiber bundles in one direction or a sheet having them layered at different angles is stitched so as not to have a loose sheet.

Weight per unit area of the reinforced area (weight per m² of fiber) is, although not particularly limited, preferably 10 g/m² to 650 g/m². As the weight per unit area is 10 g/m² or more, irregularity of fiber width is small to yield a favorable physical property, and thus preferable. As the weight per unit area is 650 g/m² or less, favorable resin impregnation is obtained, and thus preferable. The weight per unit area is more preferably 50 to 500 g/m², and particularly preferably 50 to 300 g/m².

The content of the carbon fibers (C) in the prepreg of the invention is preferably in the range of 25 to 80% by mass, and more preferably in the range of 40 to 70% by mass, from the viewpoint of having more enhanced mechanical strength of a molded article to be obtained.

Furthermore, from the viewpoint of enhancing further the workability, it is preferable to use an ethylenically unsaturated monomer as a raw material of the prepreg of the invention. Examples of the ethylenically unsaturated monomer include a styrene compound such as styrene, methylstyrene, halogenated styrene, or divinylbenzene; a monofunctional (meth)acrylate compound such as methyl (meth)acrylate, ethyl (meth)acrylate, propyl (meth)acrylate, butyl (meth)acrylate, 2-ethylhexyl (meth)acrylate, cyclohexyl (meth)acrylate, isobornyl (meth)acrylate, benzyl (meth)acrylate, methylbenzyl (meth)acrylate, phenoxyethyl (meth)acrylate, methylphenoxyethyl (meth)acrylate, morpholine (meth)acrylate, phenylphenoxyethyl acrylate, phenylbenzyl (meth)acrylate, phenyl methacrylate, dicyclopentenyl (meth)acrylate, dicyclopentenyloxyethyl (meth)acrylate, or dicyclopentanyl methacrylate; a hydroxyl group-containing (meth)acrylate compound such as hydroxyethyl (meth)acrylate, hydroxypropyl (meth)acrylate, or hydroxybutyl (meth) acrylate; and a di(meth)acrylate compound such as ethylene glycol di(meth)acrylate, propylene glycol di(meth)acrylate, 1,4-butane diol di(meth)acrylate, 1,6-hexane diol di(meth) acrylate, bisphenol di(meth)acrylate, or 1,4-cyclohexanedimethanol di(meth)acrylate. They may be used either singly or in combination of two or more kinds thereof.

Among them, from the viewpoint of malodor and handling of a hazardous product in work environment and also the mechanical strength and heat resistance of a molded article, monofunctional (meth)acrylate which has molecular weight of 150 to 250 is preferable, phenoxyethyl (meth)acrylate, methylphenoxyethyl (meth)acrylate, benzyl (meth)acrylate, and methylbenzyl (meth)acrylate are more preferable, and phenoxyethyl (meth)acrylate and benzyl (meth)acrylate are even more preferable.

From the viewpoint having more enhanced balance between the workability (tack property) and the heat resistance and curing property, the ethylenically unsaturated monomer is preferably 1 to 50% by mass, and more preferably 5 to 30% by mass in raw materials of the prepreg of the invention.

As for the components of the prepreg of the invention, those other than described above can be used, and for example, a thermosetting resin, a thermoplastic resin, a polymerization inhibitor, a curing promoter, a filler, a low shrinkage agent, a releasing agent, a thickening agent, a viscosity-reducing agent, a pigment, an anti-oxidant, a plasticizer, a flame retardant, an anti-microbial agent, a UV stabilizer, a reinforcing agent, a photocuring agent, or the like may be contained.

Examples of the thermosetting resin include a vinyl ester resin, an unsaturated polyester resin, a phenol resin, a melamine resin, and a furan resin. The thermosetting resin may be used either singly or in combination of two or more kinds thereof.

Examples of the thermoplastic resin include an polyamide resin, a polyethylene terephthalate resin, a polybutylene terephthalate resin, a polycarbonate resin, a urethane resin, a polypropylene resin, a polyethylene resin, a polystyrene resin, an acryl resin, a polybutadiene resin, a polyisoprene resin, and a resin obtained by modifying them according to copolymerization or the like. Furthermore, the thermoplastic resin may be used either singly or in combination of two or more kinds thereof.

Examples of the polymerization inhibitor include hydroquinone, trimethylhydroquinone, p-t-butylcatechol, t-butylhydroquinone, toluhydroquinone, p-benzoquinone, naphthoquinone, hydroquinone monomethyl ether, phenothiazine, copper naphthenate, and copper chloride. The polymerization inhibitor may be used either singly or in combination of two or more kinds thereof.

Examples of the curing promoter include metal soaps such as cobalt naphthenate, cobalt octenate, vanadyl octenate, copper naphthenate, or barium naphthenate, and metal chelate compounds such as vanadyl acetyl acetate, cobalt acetyl acetate, or iron acetylacetonate. Furthermore, examples of amines include N,N-dimethylamino-p-benzaldehyde, N,N-dimethylaniline, N,N-diethylaniline, N,N-dimethyl-p-toluidine, N-ethyl-m-toluidine, triethanolamine, m-toluidine, diethylenetriamine, pyridine, phenylmorpholine, piperidine, and diethanolaniline. The curing promoter may be used either singly or in combination of two or more kinds thereof.

Examples of the filler include an inorganic compound and an organic compound, and it can be used for adjusting the physical properties of a molded article such as strength, elasticity, impact strength, fatigue durability, or the like.

Examples of the inorganic compound include calcium carbonate, magnesium carbonate, barium sulfate, mica, talc, kaolin, clay, celite, asbestos, barite, barita, silica, siliceous sand, dolomite limestone, gypsum, aluminum finer powder, hollow balloon, alumina, glass powder, aluminum hydroxide, galuberite, zirconium oxide, antimony trioxide, titanium oxide, molybdenum dioxide, and iron powder.

Examples of the organic compound include natural polysaccharide powder such as cellulose or chitin and synthetic resin powder. As for the synthetic resin powder, powder of organic materials made of hard resin, soft rubber, elastomer or polymer (copolymer), or particles having multilayer structure like core-shell type can be used. Specific examples thereof include particles made of butadiene rubber and/or acryl rubber, urethane rubber, silicone rubber, or the like, polyimide resin powder, fluororesin powder, and phenol resin powder. The filler may be used either singly or in combination of two or more kinds thereof.

Examples of the releasing agent include zinc stearate, calcium stearate, paraffin wax, polyethylene wax, and carnauba wax. Preferred examples thereof include paraffin wax, polyethylene wax, and carnauba wax. The releasing agent may be used either singly or in combination of two or more kinds thereof.

Examples of the thickening agent include metal oxides such as magnesium oxide, magnesium hydroxide, calcium oxide, or calcium hydroxide and microparticles of acrylic resin, and it can be suitably selected based on the handling property of the prepreg of the invention. The thickening agent may be used either singly or in combination of two or more kinds thereof.

The prepreg of the invention is obtained by, with a use of a known mixing device like planetary mixer and kneader, for example, step 1 in which the reinforcing fibers (C) are impregnated with a resin solution in which the polymethylene polyphenyl polyisocyanate (a1-1), other isocyanate (a1-2), the compound (a2-1) having a hydroxyl group and a (meth)acryloyl group, other polyol (a2-2), and the polymerization initiator (B) are admixed with one another, inserted with a PET release film from the top surface, and rolled under pressure using a roller to obtain a sheet, and step 2 in which the sheet is allowed to stand at room temperature to 50° C. to have a reaction between the isocyanate group of the polyisocyanate compound (a1) and the hydroxyl group of the hydroxyl group-containing compound (a2).

The thickness of the prepreg of the invention is preferably 0.02 to 1.0 mm. As the thickness becomes 0.02 mm or more, handling for layering becomes easy, which is preferable. On the other hand, as the thickness becomes 1 mm or less, the impregnation with the resin becomes favorable, which is preferable. The thickness is more preferably 0.05 to 0.5 mm.

A method for use in obtaining a molded article from the prepreg obtained above includes, for example, releasing the prepreg from the PET release film, stacking 8 to 16 pieces of the prepreg and then placing the stack in a mold which has been heated in advance to 110° C. to 160° C., performing mold clamping with a pressure molding device to shape the prepreg, maintaining a molding pressure of 0.1 to 10 MPa to cure the prepreg, and then taking out the cured product to obtain a molded article. In that case, the production method preferably includes performing the thermal compression molding in a mold with a share edge structure at a mold temperature of 120° C. to 160° C. under a molding pressure maintained at 1 to 8 MPa for a time period that is specified to be 1 to 2 minutes per 1 mm thickness of the molded article.

The molded article obtained from the prepreg of the invention can be suitably used, as it is excellent in terms of interlayer shear strength, heat resistance, or the like, for an automotive member, a railroad car member, an airspace craft member, a ship member, a house facility member, a sports member, a light-weight vehicle member, a construction and civil engineering member, a case body of an OA instrument, or the like.

EXAMPLES

Hereinbelow, the invention will be described in more detail in view of specific examples.

Example 1: Production and Evaluation of Prepreg (1)

Mixed were 100 parts of a mixture of polymethylene polyphenyl polyisocyanate and MDI (MILLIONATE MR-200 manufactured by Tosoh Corporation with a polymethylene polyphenyl polyisocyanate content of 56%; hereinafter abbreviated as "polymeric MDI mixture (1)"), 75.5 parts of hydroxyethyl methacrylate, 15 parts of pentaerythritol polyoxyethylene ether (PNT-40 manufactured by NIPPON NYUKAZAI CO., LTD.), 21 parts of phenoxyethyl methacrylate, and 2 parts of a polymerization initiator (Trigonox 27 manufactured by Kayaku Akzo Corporation, organic peroxide). After the resulting mixture was applied to one surface of a PET release film, carbon fibers (TRK979PQRW manufactured by Mitsubishi Rayon Co., Ltd.) were impregnated with the mixture by a hand lay-up method in such a way that the carbon fiber content was 55%. The product was covered with the same PET release film and then subjected to aging under conditions at 45° C. for 24 hours to form a prepreg (1). For the prepreg (1), the content of the polymethylene polyphenyl polyisocyanate in the raw materials excluding the carbon fibers was 26% by mass, and the molar ratio (NCO/OH) was 0.9. In addition, its thickness was 0.25 mm.

[Evaluation of Workability (Tack Property)]

The workability during separation of the resulting prepreg (1) from the release film (SP-PET) at room temperature was evaluated based on the following criteria.

◯: Some of the resin adheres to the release film.

x: No resin adheres to the release film.

[Production of Molded Article]

Nine pieces of the resulting prepreg (1) were stacked and placed in a press machine. While a pressure of 0.98 MPa was applied to the stack, the resin was cured under conditions at 140° C. for 2 minutes to form a molded article (1).

[Evaluation of Molding Property]

The difference between the carbon fiber content of the prepreg (1) and the carbon fiber content of the resulting molded article (1) was measured, and the molding property was evaluated based on the following criteria.

◯: The carbon fiber content difference is less than 5%.

x: The carbon fiber content difference is 5% or more.

[Interlayer Shear Strength of Molded Article]

Test pieces with a width of 10 mm and a length of 22 mm were cut from the resulting molded article (1) and then subjected to measurement of interlayer shear strength according to JIS K 7078. The measured interlayer shear strength was evaluated based on the following criteria.

◯: 75 MPa or higher x: Lower than 75 MPa

[Heat Resistance]

Test pieces with a width of 5 mm and a length of 55 mm were cut from the resulting molded article (1) and then subjected to measurement of dynamic viscoelasticity with DMS6100 manufactured by SII Nanotechnology Inc. at a measurement frequency of 1 Hz and a temperature increase rate of 3° C./minute, in which the cured product was double-supported and bent. The point of intersection between an approximated straight line of the glass region and the tangential line of the transition region in the resulting storage elasticity chart was determined to be the glass transition temperature, which was evaluated based on the following criteria.

◯: The glass transition temperature is 130° C. or higher.

x: The glass transition temperature is lower than 130° C.

Example 2: Production and Evaluation of Prepreg (2)

Mixed were 75 parts of the polymeric MDI mixture (1), parts of hydroxyethyl methacrylate, 25 parts of pentaerythritolpolyoxyethylene ether (PNT-40 manufactured by NIPPON NYUKAZAI CO., LTD.), 21 parts of phenoxyethyl methacrylate, and 2 parts of a polymerization initiator (Trigonox 27 manufactured by Kayaku Akzo Corporation, organic peroxide). After the resulting mixture was applied to one surface of a PET release film, carbon fibers (TRK979PQRW manufactured by Mitsubishi Rayon Co., Ltd.) were impregnated with the mixture by a hand lay-up method in such a way that the carbon fiber content was 55%. The product was covered with the same PET release film and then subjected to aging under conditions at 45° C. for 24 hours to form a prepreg (2). For the prepreg (2), the content of the polymethylene polyphenyl polyisocyanate in the raw materials excluding the carbon fibers was 7% by mass, and the molar ratio (NCO/OH) was 0.9. In addition, its thickness was 0.25 mm.

A molded article (2) was produced in the same manner as Example 1 except that the prepreg (1) used in Example 1 was changed to the prepreg (2), and then each evaluation was carried out.

Comparative Example 1: Production and Evaluation of Prepreg (R1)

Mixed were 100 parts of MDI (MILLIONATE MT manufactured by Tosoh Corporation), 57 parts of hydroxyethyl methacrylate, 32 parts of pentaerythritol polyoxyethylene ether (PNT-40 manufactured by NIPPON NYUKAZAI CO., LTD.), 21 parts of phenoxyethyl methacrylate, and 2 parts of a polymerization initiator (Trigonox 27 manufactured by Kayaku Akzo Corporation, organic peroxide). After the resulting mixture was applied to one surface of a PET release film, carbon fibers (TRK979PQRW manufactured by Mitsubishi Rayon Co., Ltd.) were impregnated with the mixture by a hand lay-up method in such a way that the carbon fiber content was 55%. The product was covered with the same PET release film and then subjected to aging under conditions at 45° C. for 24 hours to form a prepreg (R1). In the prepreg (R1), the molar ratio (NCO/OH) was 0.9. In addition, its thickness was 0.25 mm.

A molded article (R1) was produced in the same manner as Example 1 except that the prepreg (1) used in Example 1 was changed to the prepreg (R1), and then each evaluation was carried out.

Comparative Example 2: Production and Evaluation of Prepreg (R2)

Mixed were 100 parts of IPDI (VESTANAT IPDI manufactured by Evonik Degussa Japan Co., Ltd.), 55 parts of hydroxyethyl methacrylate, 38 parts of pentaerythritol polyoxyethylene ether (PNT-40 manufactured by NIPPON NYUKAZAI CO., LTD.), 21 parts of phenoxyethyl methacrylate, and 2.2 parts of a polymerization initiator (Trigonox 27 manufactured by Kayaku Akzo Corporation, organic peroxide). After the resulting mixture was applied to one surface of a PET release film, carbon fibers (TRK979PQRW manufactured by Mitsubishi Rayon Co., Ltd.) were impregnated with the mixture by a hand lay-up method in such a way that the carbon fiber content was 55%. The product was covered with the same PET release film and then subjected to aging under conditions at 45° C. for 24 hours to form a prepreg (R2). In the prepreg (R2), the molar ratio (NCO/OH) was 0.9. In addition, its thickness was 0.25 mm.

A molded article (R2) was produced in the same manner as Example 1 except that the prepreg (1) used in Example 1 was changed to the prepreg (R2), and then each evaluation was carried out.

Comparative Example 3: Production and Evaluation of Prepreg (R3)

Mixed were 100 parts of TDI (COSMONATE T-80 manufactured by Mitsui Chemicals, Inc.), 70 parts of hydroxyethyl methacrylate, 49 parts of pentaerythritol polyoxyethylene ether (PNT-40 manufactured by NIPPON NYUKAZAI CO., LTD.), 24 parts of phenoxyethyl methacrylate, and 2.5 parts of a polymerization initiator (Trigonox 27 manufactured by Kayaku Akzo Corporation, organic peroxide). After the resulting mixture was applied to one surface of a PET release film, carbon fibers (TRK979PQRW manufactured by Mitsubishi Rayon Co., Ltd.) were impregnated with the mixture by a hand lay-up method in such a way that the carbon fiber content was 55%. The product was covered with the same PET release film and then subjected to aging under conditions at 45° C. for 24 hours to form a prepreg (R3). In the prepreg (R3), the molar ratio (NCO/OH) was 0.9. In addition, its thickness was 0.25 mm.

A molded article (R3) was produced in the same manner as Example 1 except that the prepreg (1) used in Example 1 was changed to the prepreg (R3), and then each evaluation was carried out.

Table 1 shows the results of evaluation of the prepregs (1) to (3) and (R1) to (R3) obtained as described above.

TABLE 1

| | | Example 1 | Example 2 | Comparative Example 1 | Comparative Example 2 | Comparative Example 3 |
|---|---|---|---|---|---|---|
| | Prepreg | (1) | (2) | (R1) | (R2) | (R3) |
| Composition of urethane (meth)acrylate (parts by mass) | Polymeric MDI mixture (1) (polymethylene polyphenyl polyisocyanate 56% by mass) | 100 | 25 | | | |
| | MDI | | 75 | 100 | | |
| | IPDI | | | | 100 | |
| | TDI | | | | | 100 |
| | Hydroxyethyl methacrylate | 76 | 67 | 57 | 55 | 70 |
| | Pentaerythritol polyoxyethylene ether | 15 | 25 | 32 | 38 | 49 |
| Content of polymethylene polyphenyl polyisocyanate in raw materials excluding carbon fibers (% by mass) | | 26 | 7 | 0 | 0 | 0 |
| Evaluation result | Workability (tack property) | ○ | ○ | ○ | ○ | ○ |
| | Molding property (difference in carbon fiber content) | ○ 2% | ○ 2% | ○ 0% | x 7% | x 6% |
| | Interlayer shear strength | ○ 86 MPa | ○ 82 MPa | x 73 MPa | x 68 MPa | x 62 MPa |
| | Heat resistance (glass transition temperature) | ○ 146° C. | ○ 131° C. | x 125° C. | x 113° C. | x 112° C. |

It has been found that the prepregs of Examples 1 and 2 according to the invention are excellent in workability and molding property, and the molded articles obtained from the prepregs are excellent in interlayer shear strength and heat resistance.

On the other hand, it has been found that in Comparative Example 1, which is an example where MDI is used instead of polymethylene polyphenyl polyisocyanate, an essential component in the invention, the molded article is insufficient in interlayer shear strength and heat resistance.

It has been found that in Comparative Example 2, which is an example where IPDI is used instead of polymethylene polyphenyl polyisocyanate, an essential component in the invention, the molding property is insufficient and also the molded article is insufficient in interlayer shear strength and heat resistance.

It has been found that in Comparative Example 3, which is an example where TDI is used instead of polymethylene polyphenyl polyisocyanate, an essential component in the invention, the molding property is insufficient and also the molded article is insufficient in interlayer shear strength and heat resistance.

The invention claimed is:

1. A prepreg comprising:
    a urethane (meth)acrylate (A) that is a reaction product of a polyisocyanate compound (a1) comprising a polymethylene polyphenyl polyisocyanate (a1-1) as an essential component with a hydroxyl group-containing compound (a2) comprising, as an essential component, a compound (a2-1) having a hydroxyl group and a (meth) acryloyl group;
    a polymerization initiator (B); and
    carbon fibers (C);
    wherein the prepreg is obtained by
    step 1 in which the carbon fibers (C) are impregnated with a resin solution in which the polymethylene polyphenyl polyisocyanate (a1-1), other isocyanate (a1-2), the compound (a2-1) having a hydroxyl group and a (meth) acryloyl group, other polyol (a2-2), and the polymerization initiator (B) are admixed with one another, and rolled under pressure using a roller to obtain a sheet, and
    step 2 in which the sheet is allowed to stand at room temperature to 50° C. to have a reaction between the isocyanate group of the polyisocyanate compound (a1) and the hydroxyl group of the hydroxyl group-containing compound (a2).

2. The prepreg according to claim 1, wherein the content of the polymethylene polyphenyl polyisocyanate (a1-1) in raw materials excluding the carbon fibers (C) is in the range of from 1 to 40% by mass.

* * * * *